Dec. 29, 1959 — H. E. RUPP II — 2,918,981
DRIVING AND BRAKING ARRANGEMENT FOR AN AUTOMOTIVE VEHICLE
Filed May 20, 1959 — 2 Sheets-Sheet 1
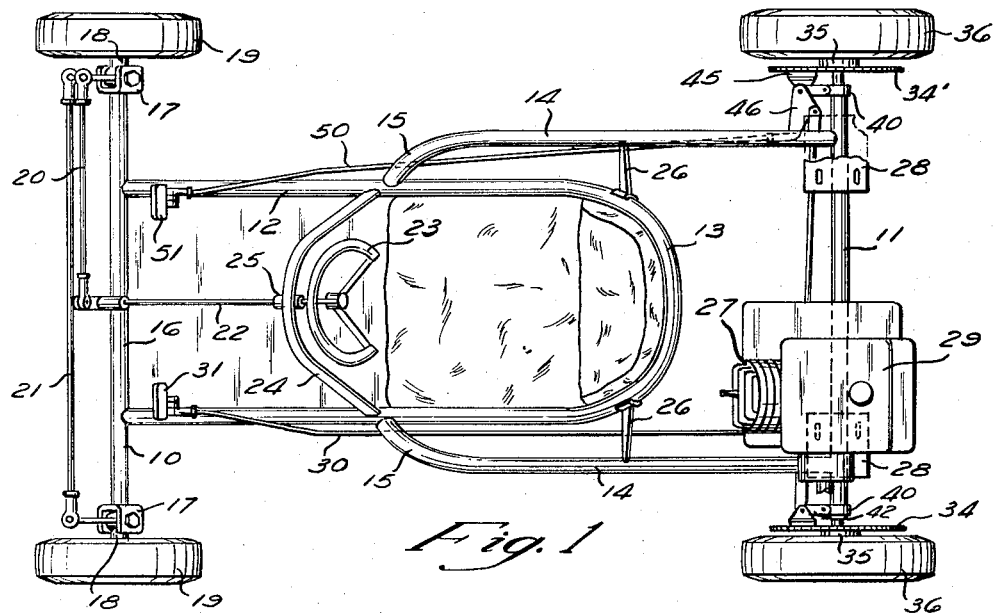
Fig. 1
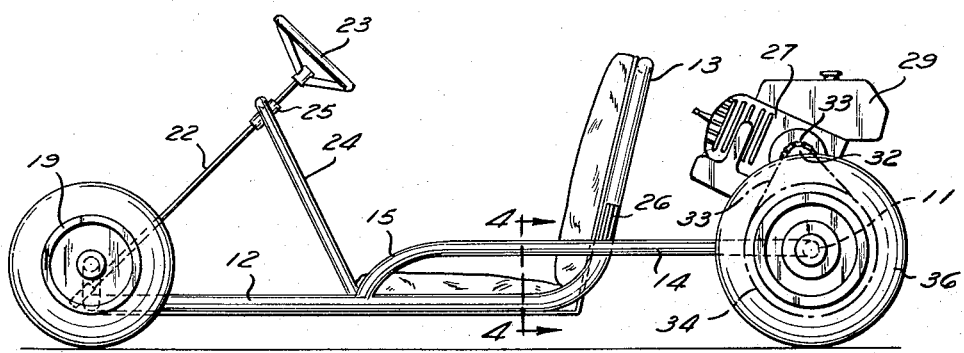
Fig. 2
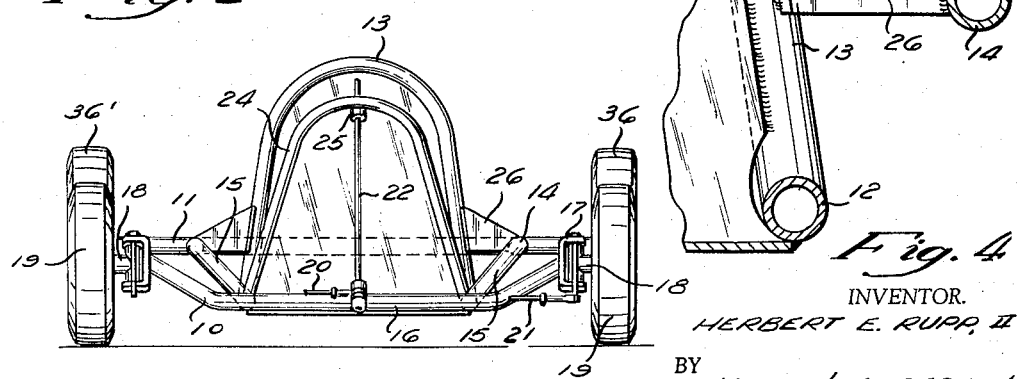
Fig. 3
Fig. 4
INVENTOR.
HERBERT E. RUPP, II
BY WATTS & EDGERTON
ATTORNEYS

INVENTOR.
HERBERT E. RUPP, II
BY
WATTS & EDGERTON
ATTORNEYS

United States Patent Office 2,918,981
Patented Dec. 29, 1959

2,918,981

DRIVING AND BRAKING ARRANGEMENT FOR AN AUTOMOTIVE VEHICLE

Herbert E. Rupp II, Mansfield, Ohio

Application May 20, 1959, Serial No. 814,482

5 Claims. (Cl. 180—62)

This invention relates broadly to automotive vehicles and more specifically to brake mechanisms therefor.

The brake embodying the present invention is illustrated in conjunction with an automobile midget racing car, but it is to be understood that the invention is not limited to such use.

One of the objects of the invention is to provide an equalizing mechanism in the brake linkage to effect a simultaneous uniform effort of resistance on both wheels of the vehicle during the application of the brakes.

Another object of the invention is to provide a brake having the brake shoes mounted for ready access to accommodate renewal of the frictional material thereon with ease and dispatch.

Another object of the invention is to provide linkage in the brake assembly having pull rods thereon arranged for ready access when adjustment is required.

Further objects of the invention reside in the provision of a brake which is simple of structure, efficient of operation, and economic of manufacture, assembly and installation.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 1 is a plan view of an automotive vehicle illustrating the improved brake assembly thereon.

Fig. 2 is a side elevational view thereof.

Fig. 3 is a front elevational view of the vehicle.

Fig. 4 is a vertical sectional view of a fragmentary portion of the chassis frame, the section being taken on a plane indicated by the line 4—4 in Fig. 2.

Figure 5:
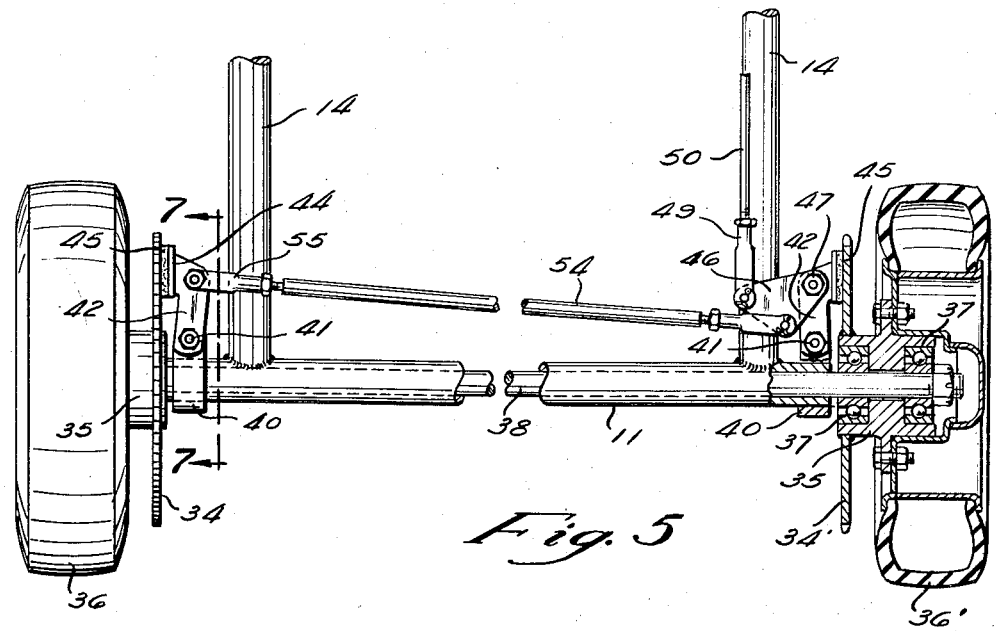
Fig. 5 is a plan view of the rearward end of the vehicle, portions thereof being broken away and shown in section in the interest of clarity.
Figure 6:
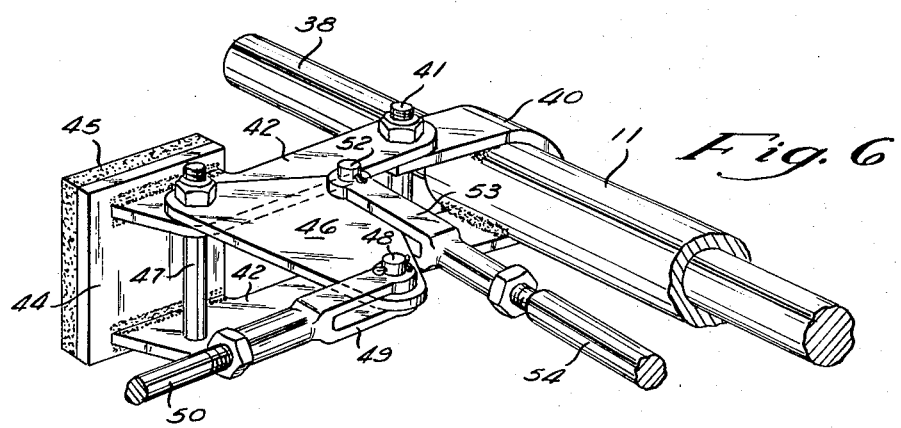
Fig. 6 is a view in perspective of a portion of the rear axle, the brake supporting yokes thereon, the brake linkage, and pull rods therefor.
Figure 7:
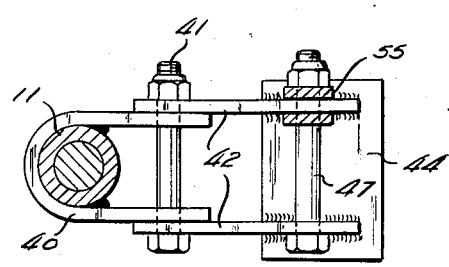
Fig. 7 is a sectional view of the supporting structure for the brake shoe opposite that shown in Fig. 6, the section being taken on a plane indicated by the line 7—7 in Fig. 5.

Referring first to Fig. 1, the vehicle comprises a tubular chassis construction embodying a front axle 10, a rear axle 11, and a frame including a forward U shape frame member 12 having the parallel arms thereof welded to the front axle and a looped upward and rearly inclined end portion 13 constituting a back rest for the driver. The frame members 12 are provided with secondary vertically spaced side rails 14 having depending forward end portion 15 welded to the frame members 12 and substantially parallel horizontal side portions welded at their ends to the rear axle 11. The side portions form hand rails or arms for the driver and are elevated from the ground to prevent injury. The front axle is formed with a central depressed portion 16, and yoked end brackets 17 welded on each end thereof for steering knuckles and wheel spindles 18. Front wheels 19, having pneumatic tires thereon, are mounted on the steering knuckles which are connected to the drag link 20 pivoted on a tie rod 21. A steering column 22, which is inclined upwardly and rearwardly, has a steering wheel 23 affixed to the free end thereof. The steering column is supported by a U frame 24 welded at its lower ends to the frame members 12 and secured in the center thereof to a sleeve 25 on the steering column 22. Secondary side rails 14, wider than the frame members 12, are connected to the back rest 13 by brackets 26. An engine 27 is mounted on pads 28 secured to the rear axle 11. The engine is preferably disposed in offset relation to the medial axis of the chassis frame so a second motor (not shown) may be mounted thereon. The engine shown herein is of an air cooled type and has a fuel tank 29 on the top thereof and a throttle control rod 30 connected to an accelerator pedal 31 pivotally connected to the forward end of the frame member 12. The crank shaft of the engine has a sprocket 32 thereon which is connected by an endless chain 33 to a sprocket wheel 34 affixed to a hub 35 of the adjacent rear wheel 36. A second rear wheel 36' is supported on the opposite end of the axle, both wheels being journaled in anti-friction bearings 37 on the end of an axle rod 38 within the rear axle tubular axle member 11. When two engines are employed, the second engine driving sprocket and chain may be connected to a second sprocket 34'. The tubular axle housing 11 has a U strap 40 welded on each end thereof adjacent the hubs 35 of the wheels. The free ends of the straps are drilled in aligned relation for a bolt 41 constituting fulcrums for a pair of spaced brake shoe arms 42, as shown on the right hand side of Fig. 5, and in the perspective view of Fig. 6. The arms are integral with brake shoe plates 44, and normal thereto. The brake shoes are provided with a friction material 45 on the outer face thereof for engagement with the faces of the sprocket wheels 34 and 34'. The upper leg of the arm 42 has a triangular plate 46 thereon constituting a bell crank, one end thereof being pivoted on a bolt 47 and supported by the movable brake shoe, the second end being pivoted on a pin 48 in a yoke 49 on a pull rod 50 pivotally connected at its forward end to a brake pedal 51. The offset central portion of the plate 46 has a pin 52 therein which pivotally supports a yoke 53 coupled to an equalizer bar 54 fulcrumed at its opposed end to a yoke 55 pivoted to the arms 42 that support the opposed brake shoe plate 44.

In operation, when the brake pedal 51 is actuated, the pull rod 50 will rotate the plate 46 about the bolt 47 for the equalizing bar and swing the end of the plate outwardly and thus effect the engagement of the brake shoe friction material 45 into engagement with the face of the sprocket wheels 34 and 34'. As the pull rod 50 is actuated and the plate 46 is rotated the equalizer bar 54 is pushed axially toward the yoke 55 to force the brake shoe friction material 45 into engagement with the sprocket wheel 34. Obviously, when one engine is employed, only one wheel of the vehicle is driven, the second wheel being rotated by the movement of the vehicle over the ground, thus when the brake is applied the rotative movement of both wheels is restrained by the brake shoes and the application of pressure on the shoes is equalized by the bar 54 and the pivotal connectors associated therewith. When two engines are employed, the braking effort and equalization of pressure is similar, save only the additional drag of the second engine after the throttle is closed.

Figure 8:
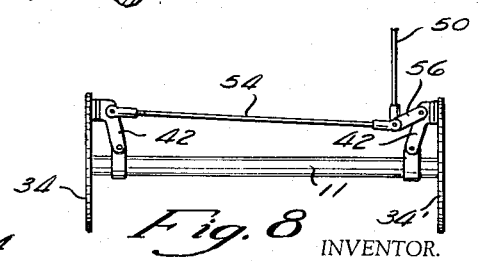
Fig. 8 is a diagrammatic view of a modified form of the brake equalizing mechanism.

If desired, a disc having a smooth circumferential edge may be substituted for the sprocket wheel 34 and as diagrammatically illustrated in line drawing of Fig. 8, the pull rod 50 may be pivotally interlinked with the equalizing bar 54 fulcrumed on one of the arms 42 and on a link 56 pivoted to the opposed arc 42 so simultaneous outward movement of the brake shoes 44 will be effected upon actuation of the broke pull rod 50. A yoke screw threaded on either end of the bar 54 or a similar adjusting mechanism, may be employed to alter the effective length of the rod. A single adjusting unit may be employed in order to conserve time and effort of adjustment.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A driving and braking arrangement for an automotive vehicle comprising a chassis having a rear axle, wheels mounted for rotation relative to said rear axle, discs affixed to said wheels, at least one of said discs having sprocket teeth on its outer periphery, means for propelling said vehicle including at least one engine means supported by said rear axle and having a driven sprocket connected by an endless chain with said sprocket teeth on said one of said discs, and means for braking the vehicle including brake arms pivotally connected to the chassis and carrying brake shoes engageable with opposed sides of said discs, a member pivotally connected to one of said arms, means pivotally connecting said member to the other arm, and means pivotally connected to said member and operative when moved endwise in one direction to move said brake shoes against their respective discs.

2. A driving and braking arrangement for an automotive vehicle comprising a chassis having a rear axle, wheels rotatably mounted at the ends of said axle, discs affixed to said wheels, at least one of said discs having sprocket teeth on its outer periphery, means including engine means for propelling said vehicle including at least one engine means supported by said chassis and having a driven sprocket connected by an endless chain with said sprocket teeth on said one of said discs, and means for braking the vehicle including brake arms pivotally connected to said rear axle and carrying brake shoes engageable with opposed sides of said discs, a bell crank pivotally connected to one of said arms, means connecting said bell crank to the other arm, and means connected to said bell crank and operative when moved endwise in one direction to move said brake shoes against their respective discs.

3. A driving and braking arrangement for an automotive vehicle comprising a chassis having a tubular rear axle, an axle rod in said rear axle, wheels rotatably mounted on said axle rod, discs affixed to said wheels, and having sprocket teeth on their outer peripheries, engine mounts on the rear axle adjacent to the wheels, means for propelling said behicle including an engine on at least one of said mounts, and having a driven sprocket connected by an endless chain with said sprocket teeth on the adjacent disc, and means for braking the behicle including brake arms pivotally connected to the rear axle and carrying brake shoes engageable with opposed sides of said discs, an equalizing bar connected at one end to one of said arms, a member pivotally connected to the other arm and to the other end of the said bar and means connected to said member and operative when moved endwise in one direction to move said brake shoes against their respective discs.

4. A driving and braking arrangement for an automotive vehicle comprising a chassis having a rear axle, wheels mounted for rotation relative to said rear axle, discs affixed to the inner opposed sides of said wheels, said discs having sprocket teeth on their outer peripheries, engine mounts affixed to the rear axle and adjacent to said discs, means for propelling said vehicle including engines mounted on said mounts and having driven sprockets connected by endless chains with the sprocket teeth on said discs, and means for braking the behicle including brake arms pivotally connected to the rear axle and carrying brake shoes engageable with opposed sides of said discs, an equalizing member connected at one end to one of said arms, a pivoted member pivotally connected to the other arm and to the other end of the said equalizing member and means connected to said pivoted member and operative when moved endwise in one direction to move said brake shoes against their respective discs.

5. A driving and braking arrangement for an automotive vehicle comprising a chassis having a tubular rear axle, an axle rod extending thru said rear axle, bearings on each end of said axle rod, wheels journaled on said bearings, discs affixed to said wheels, at least one of said discs having teeth on its outer periphery, engine mounts on the rear axle, means for propelling said vehicle including an engine on at least one of said mounts and including a driven sprocket and an endless chain connecting said sprocket with said sprocket teeth, and means for braking said vehicle including brake arms pivotally connected to said rear axle and having brake shoes engageable with said discs, an equalizing member connected at one end to one of said arms, a pivoted member pivotally connected to the other end of said equalizing member and to the other of said arms and means connected to said pivoted member and opertaive when moved endwise in one direction to move said brake shoes against their respective discs.

References Cited in the file of this patent

UNITED STATES PATENTS

| 661,553 | Riker | Nov. 13, 1900 |
| 700,786 | Kull | May 27, 1902 |
| 1,780,023 | Lovejoy | Oct. 28, 1930 |
| 2,274,859 | Eksergian | Mar. 3, 1942 |

FOREIGN PATENTS

| 78,675 | Austria | Oct. 10, 1919 |

UNITED STATES PATENT OFFICE
CERTIFICATE OF CORRECTION

Patent No. 2,918,981                                                          December 29, 1959

Herbert E. Rupp II

It is hereby certified that error appears in the printed specification of the above numbered patent requiring correction and that the said Letters Patent should read as corrected below.

Column 3, line 5, for "arc" read -- arm --; line 7, for "broke" read -- brake --; same column 3, line 58, and column 4, lines 3 and 21, for "behicle", each occurrence, read -- vehicle --; column 4, line 46, for "opertaive" read -- operative --.

Signed and sealed this 31st day of May 1960.

(SEAL)
Attest:

KARL H. AXLINE                                                        ROBERT C. WATSON
Attesting Officer                                               Commissioner of Patents